US012639284B2

(12) United States Patent
Swamy et al.

(10) Patent No.: US 12,639,284 B2
(45) Date of Patent: May 26, 2026

(54) MECHANISMS FOR TESTING UPDATES TO DATABASE QUERY OPTIMIZER SYSTEM

(71) Applicant: Salesforce, Inc., San Francisco, CA (US)

(72) Inventors: Prateek Swamy, Livermore, CA (US); Yi Xia, Los Angeles, CA (US); Bradley Glasbergen, Squamish (CA); Jesse Collins, Albany, CA (US); Lars Hofhansl, Orinda (CA); Jeena Vinod, Thiruvananthapuram (IN); Vaira Selvakani, Dublin, CA (US); Alfa Savla, San Jose, CA (US); Jeffrey Freschl, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/940,767

(22) Filed: Nov. 7, 2024

(65) Prior Publication Data

US 2026/0127159 A1     May 7, 2026

(51) Int. Cl.
*G06F 16/23* (2019.01)
*G06F 16/2455* (2019.01)

(52) U.S. Cl.
CPC ...... *G06F 16/2358* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 7,716,215 B2 | 5/2010 | Lohman et al. | |
| 7,945,557 B2 | 5/2011 | Cheng et al. | |
| 12,326,902 B2 * | 6/2025 | Russinovich | ....... G06F 16/9032 |
| 2011/0022586 A1 * | 1/2011 | Wilkinson | ............ G06F 16/217 |
| | | | 707/E17.014 |
| 2018/0246945 A1 * | 8/2018 | Lee | ..................... G06F 11/3476 |
| 2018/0336258 A1 * | 11/2018 | Lee | ......................... G06F 11/36 |
| 2019/0294596 A1 * | 9/2019 | Yan | ..................... G06F 11/0712 |
| 2020/0183929 A1 * | 6/2020 | Lee | ........................ G06F 16/116 |
| 2021/0263929 A1 * | 8/2021 | Chen | ................. G06F 16/24539 |
| 2021/0311850 A1 * | 10/2021 | Park | ...................... G06F 16/182 |

* cited by examiner

*Primary Examiner* — Richard L Bowen
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that relate to capturing and replaying database queries to assess the impacts of updates to a database system. A system may receive a plurality of queries from a set of users to execute against a database that stores data. The system identifies one or more of the queries that are deemed relevant to updates being made to the database system. The system executes the received queries and captures query execution information for the one or more identified queries. The system replays, based on the execution information, the one or more queries using the database system with the one or more updates enabled to determine a first performance of the database system. The system may generate a report indicating whether the first performance represents a reduction in performance relative to a second performance of the database system with the one or more updates disabled.

20 Claims, 8 Drawing Sheets

Workload
Capture
202

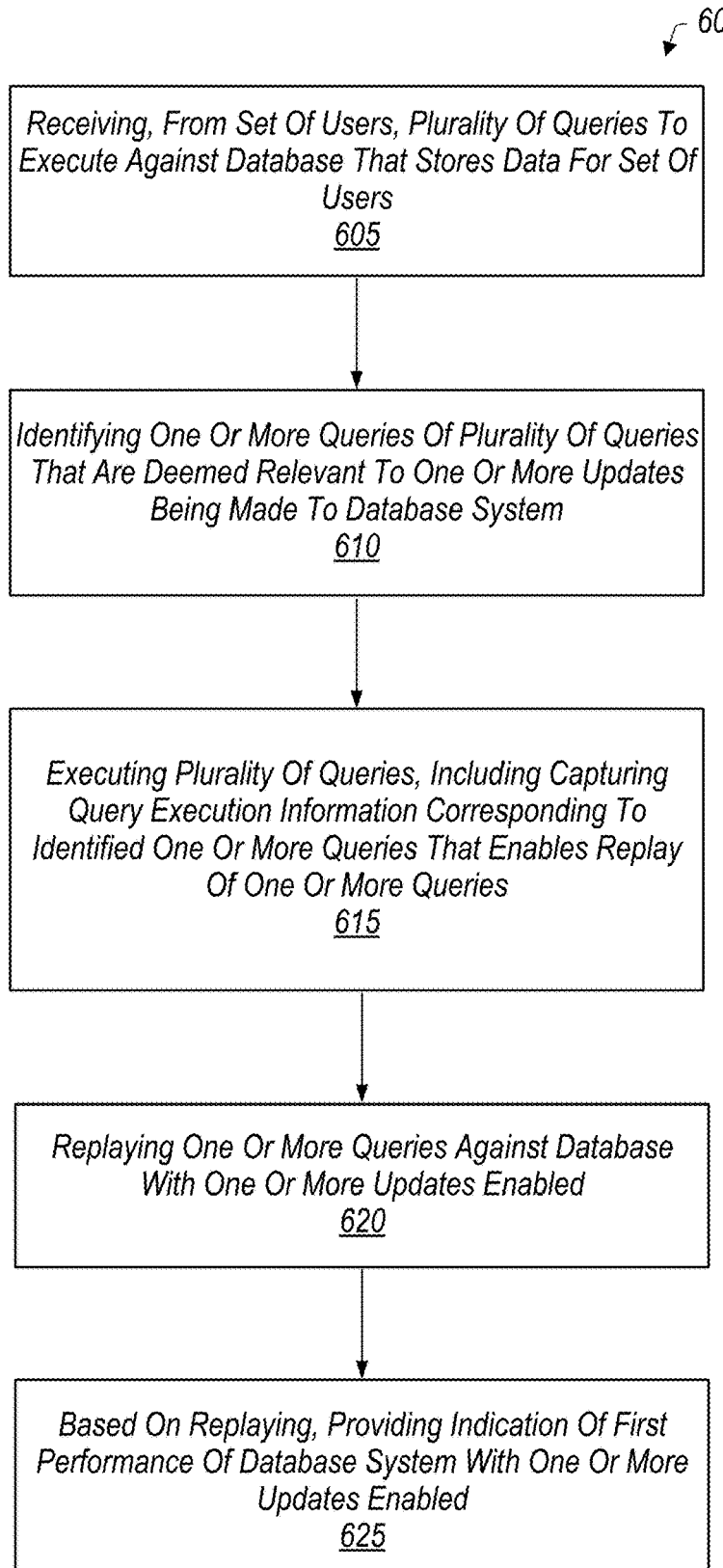

*600*

Receiving, From Set Of Users, Plurality Of Queries To Execute Against Database That Stores Data For Set Of Users
605

Identifying One Or More Queries Of Plurality Of Queries That Are Deemed Relevant To One Or More Updates Being Made To Database System
610

Executing Plurality Of Queries, Including Capturing Query Execution Information Corresponding To Identified One Or More Queries That Enables Replay Of One Or More Queries
615

Replaying One Or More Queries Against Database With One Or More Updates Enabled
620

Based On Replaying, Providing Indication Of First Performance Of Database System With One Or More Updates Enabled
625

*FIG. 6A*

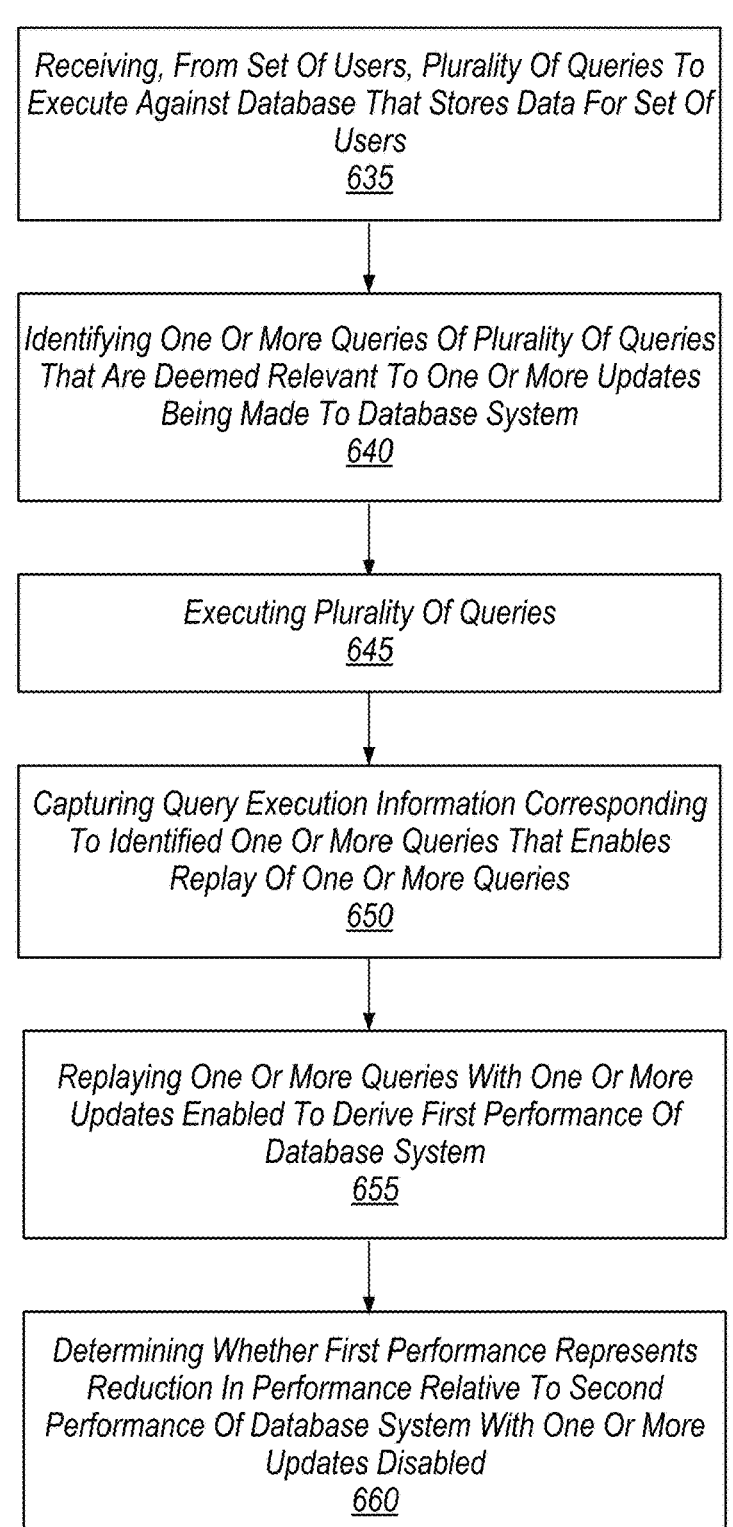

630

Receiving, From Set Of Users, Plurality Of Queries To Execute Against Database That Stores Data For Set Of Users
635

Identifying One Or More Queries Of Plurality Of Queries That Are Deemed Relevant To One Or More Updates Being Made To Database System
640

Executing Plurality Of Queries
645

Capturing Query Execution Information Corresponding To Identified One Or More Queries That Enables Replay Of One Or More Queries
650

Replaying One Or More Queries With One Or More Updates Enabled To Derive First Performance Of Database System
655

Determining Whether First Performance Represents Reduction In Performance Relative To Second Performance Of Database System With One Or More Updates Disabled
660

FIG. 6B

MECHANISMS FOR TESTING UPDATES TO DATABASE QUERY OPTIMIZER SYSTEM

BACKGROUND

Technical Field

This disclosure relates generally to database systems, and more specifically, to mechanisms for capturing and replaying queries for testing and evaluating updates to a database system.

Description of the Related Art

Testing computer systems is an important process in software and hardware development that ensures that the computer systems perform as expected under various conditions. This process often involves validating functionality, performance, security, and/or reliability by executing tests designed to identify defects, inconsistencies, or potential vulnerabilities. Various types of testing, such as unit, integration, system, and user acceptance testing, can be employed to evaluate different aspects of a system. Through these tests, developers can detect and address issues early, ensuring that the system meets user requirements, operates efficiently, and minimizes the risk of failure in real-world scenarios. Effective system testing can ultimately improve the quality and robustness of a system before deployment.

BRIEF DESCRIPTION OF THE DRAWINGS

FIGS. 6A and 6B are flow diagrams illustrating example methods that implement techniques described herein.

DETAILED DESCRIPTION

Figure 1:
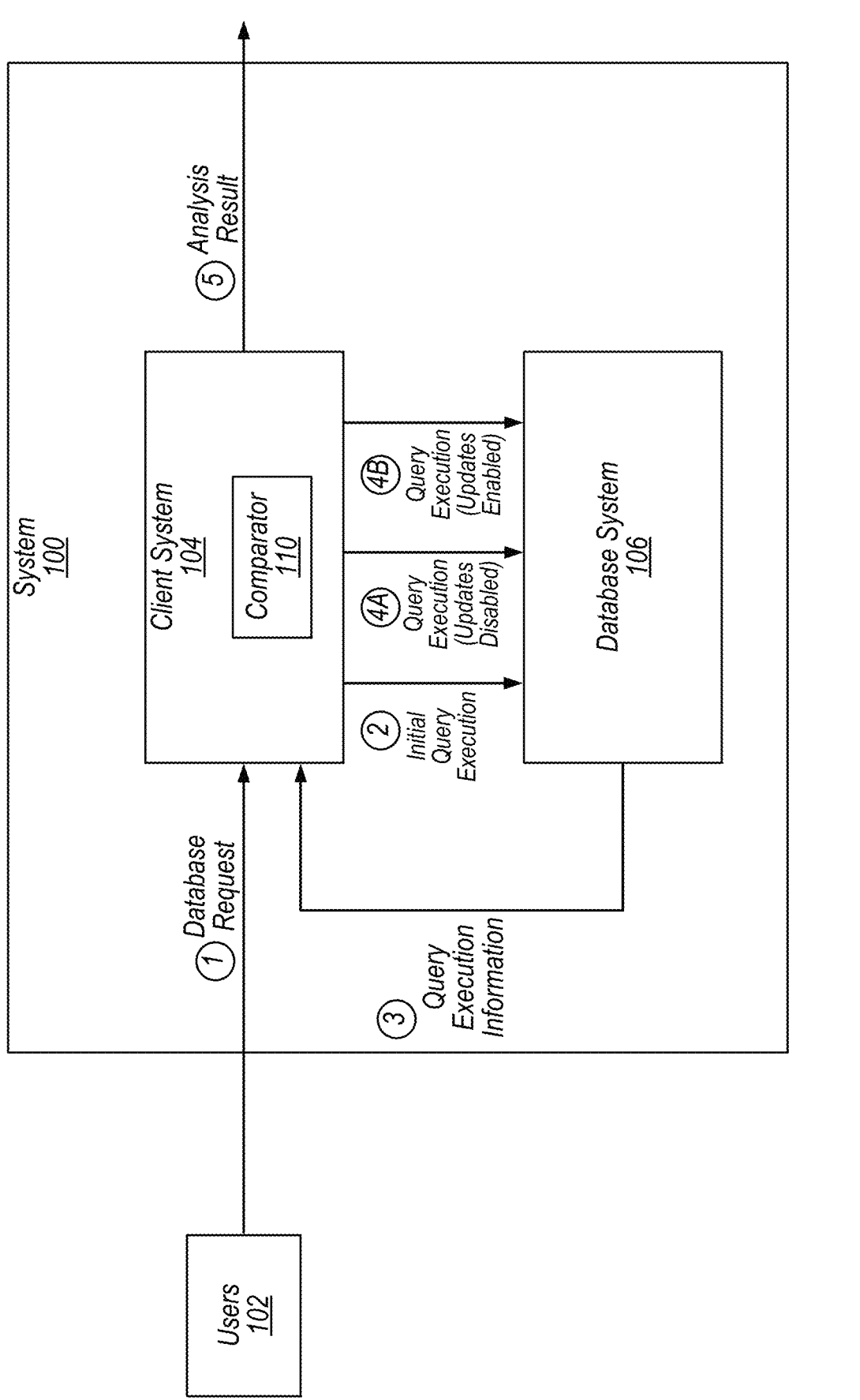
FIG. 1 is a block diagram illustrating one embodiment of a system capable of capturing and replaying queries to test and evaluate updates to a database system.

Modern database systems normally include a component, referred to as a query optimizer, that is responsible for selecting efficient execution plans for processing queries, aiming to reduce response time and resource usage. The query optimizer analyzes various ways to execute a given query and attempts to determine the most efficient execution plan for that given query, considering factors like the structure of the database, available indexes, and the size of the data. Accordingly, the optimizer attempts to select the optimal approach by evaluating the cost of different strategies, such as choosing the optimal join order, access paths, and execution methods. By minimizing the resources (e.g., time and memory) required to process a query, the optimizer can enhance overall database performance, allowing for faster retrieval and manipulation of data. The effectiveness of a database system may thus largely depend on the quality of its query optimizer.

But in large distributed database systems, updating the optimizer can present significant challenges due its scope and surface area. For example, while an update may improve performance for a particular execution plan, it can unintentionally degrade performance or cause wrong results in queries that are likely unrelated to the particular plan that was intended to be fixed by the update. Also, multiple tenants (e.g., individuals, companies, etc.) may utilize the same database system. In some cases, an update to the query optimizer improves performance for one tenant but degrades performance for other tenants whose data structures and query patterns are different. Accordingly, making changes to the query optimizer is risky due to the complexity of queries and the variety of data handled by different tenants of the database system. A/B testing and predefined test cases are often used to assess the impact of updates, but these methods can expose systems to performance risks and errors, such as in multi-tenant environments with complex and diverse queries. Existing testing methods also struggle to replicate real-world query behavior, leading to issues in production environments when updates are implemented. Accordingly, this disclosure addresses, among other things, the technical problem of how to test updates to a database system (or, more particularly, a query optimizer) in a manner that may reduce the risk of performance regressions and incorrect results occurring when the updates are deployed for users/tenants.

The present disclosure discusses various techniques for testing and validating updates to a database system (e.g., updates to an optimizer) that involve capturing and replaying user-submitted queries. In various embodiments described below, a system includes a database system and a client system that issues queries to the database system to execute. The queries may be issued in response to user requests or by user applications executing on the client system. As queries are sent to the database system, in various embodiments, the database system identifies queries that are deemed relevant to one or more updates being made to that database system (e.g., updates to an optimizer of the database system). These queries, which are deemed likely to be affected by the updates, are captured by the database system (e.g., by processes executing those queries). The database system may store captured query execution information that allows the queries to be replayed in a memory buffer accessible to the client system. The client system may transfer the captured query execution information from the memory buffer to a local database.

In order to assess the impacts of the one or more updates being made to the database system, in various embodiments, the captured user-submitted queries are replayed with the updates enabled and disabled. To replay the queries, the client system may access the query execution information and issue the queries to one or more standby nodes of the database system with the updates enabled to determine a first performance of the database system. The client system may issue the queries again to one or more standby nodes of the database system with the updates disabled to determine a second performance of the database system. In various embodiments, the first performance and the second performance are compared to determine any performance regressions, incorrect results, and/or other issues. If any issues are detected (e.g., degraded performance), then the developer(s)

of the updates may be alerted, so that the issues can be corrected before the updates affect the users of the database system.

These techniques may be advantageous as they allow for developers to assess the impacts of updates being made to a database system (e.g., an optimizer) and thus may minimize the risk of deploying troublesome updates. For example, by leveraging actual user-submitted queries, which represent real-world scenarios that may be likely to reveal optimizer-related issues, developers can discover more issues than if the developers relied solely on their own written queries. Furthermore, by capturing relevant queries during normal operation and replaying them using standby nodes of the database system (which often have extra available processing capacity), these techniques may enable thorough testing without impacting live customer traffic. By leveraging these techniques, updates to a database system can be tested in a manner that may reduce the risk of performance regressions and incorrect results occurring when the updates are deployed and begin affecting users of the database system. These techniques thus represent an improvement to database systems and the technical field of database technology.

Figure 3:
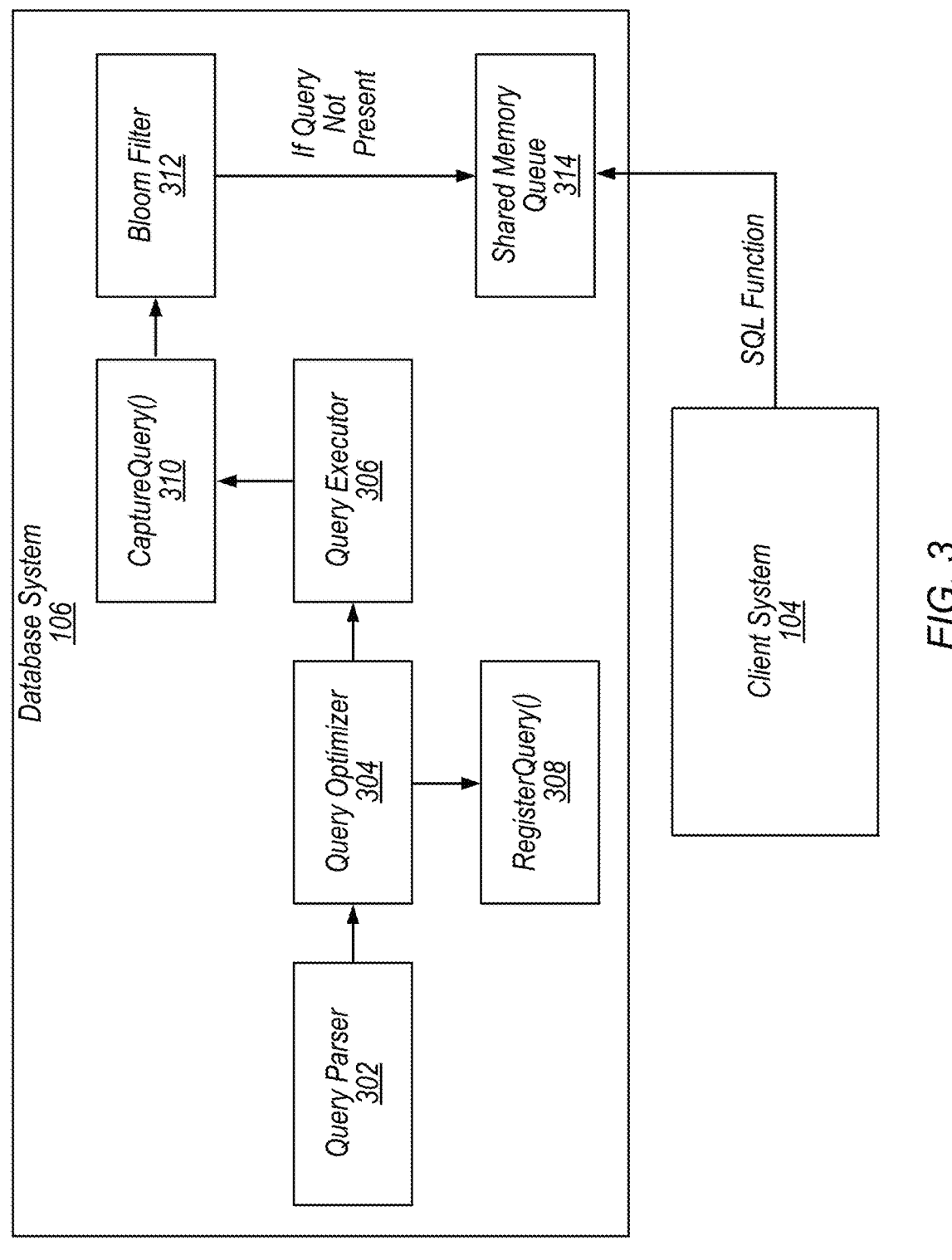
FIG. 3 is a block diagram illustrating one embodiment relating to capturing query execution information that involves an exchange between a database system and a client system.

Turning now to FIG. 1, a block diagram of a system 100 is shown. System 100 comprises components that may be implemented via hardware or a combination of hardware and software routines. In the illustrated embodiment, system 100 includes a client system 104, a database system 106, and users 102 that communicate with system 100 (particularly, client system 104). As further shown, client system 104 includes a comparator component 110. In various embodiments, this architecture enables safe and efficient evaluation of changes made to a query optimizer (e.g., query optimizer 304 as shown in FIG. 3) within database system 106 by leveraging actual user-submitted queries, which may be captured, replayed, and analyzed for performance impacts. The illustrated embodiment may be implemented differently than shown. For example, comparator 110 may be part of database system 106 instead of client system 104 and therefore database system 106 may perform at least a portion of the performance analysis.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, data stores, and other entities that are associated with system 100. In various embodiments, system 100 is implemented using a cloud infrastructure that is provided by a cloud provider. Accordingly, client system 104 and database system 106 may utilize the available cloud resources of that cloud infrastructure (e.g., computing resources, storage resources, etc.) in order to facilitate their operation. For example, software for implementing at least a portion of client system 104 may be stored on a non-transitory computer-readable medium of server-based hardware included in a datacenter of the cloud provider and executed in a virtual machine hosted on that server-based hardware. In some cases, components of system 100 are implemented without the assistance of a virtual machine or other deployment technologies, such as containerization. In some embodiments, system 100 is implemented utilizing a local or private infrastructure as opposed to a public cloud.

Users 102, in various embodiments, are tenants (e.g., individuals, companies, etc.) and/or applications submitting one or more database requests, illustrated as step 1 database request, that trigger database queries. For example, a user 102 may interact with a user interface displayed on a user device, where at least portion of that user interface may be rendered based on information provided by client system 104. That user 102 may select one or more options on the user interface to request or save particular information, resulting in a database request being sent to client system 104. In some embodiments, a user 102 may submit a database query to client system 104 or directly to database system 106.

Client system 104, in various embodiments, facilitates the execution of various applications that perform various functions and tasks, including interacting with database system 106 to access data. In various embodiments, client system 104 is software that is executable on hardware, while in some embodiments, it encompasses hardware and software. Examples of applications that can be implemented by client system 104 include a CRM application, a content streaming application, an email application, and a tenant-provided application (as opposed to an application provided by a provider of system 100). An application implemented by client system 104 may provide services to multiple tenants over a wide-area network, such as the Internet, and may be hosted on a cloud infrastructure. In various embodiments, client system 104 interfaces with database system 106 to enable users 102 to store and access their data.

Database requests from users 102 may be initially processed by client system 104, which may manage the issuance of database queries as part of a query execution or replay. Accordingly, client system 104 may serve as an intermediary between users 102 and database system 106 such that the submitted queries are captured, processed, and/or replayed under different conditions (e.g., with and without database system 106 updates). Once a database request has been received from a user 102, client system 104 may issue a corresponding database query (e.g., a structured query language (SQL) statement) to database system 106, where the query undergoes its initial execution as illustrated by step 2. To issue the query, client system 104 may establish a database connection with database system 106 (e.g., using an API, such as Java Database Connectivity) through which the query can be issued.

Database system 106, in various embodiments, implements database services, such as data storage, data retrieval, and data manipulation. In various embodiments, database system 106 is software that is executable on hardware, while in some embodiments, it encompasses hardware and software. Database system 106 may correspond to any suitable database management system (RDBMS) including Oracle®, MySQL®, Microsoft® SQL Server, PostgreSQL®, IBM® DB2, or similar systems. The database services may be provided to components within and/or external to system 100. As discussed for example, database system 106 can receive queries from client system 104 to perform one or more database operations for a database transaction. A database transaction, in various embodiments, is a logical unit of work (e.g., a specified set of database statements). For example, processing a database transaction may include executing a SELECT statement to select and return one or more rows from a table. The contents of a row may be specified in a record and thus database system 106 may return, to client system 104, one or more records corresponding to the one or more rows.

In various embodiments, database system 106 store data in tables, indexes, etc. included in a database (not shown). That database may be a collection of information that is organized in a manner that allows for access, storage, and/or manipulation of that information. The database may include supporting software (e.g., storage systems) that allows database system 106 to carry out operations (e.g., accessing) on the information stored at that database. In various embodiments, the database is implemented using a single or multiple storage devices (e.g., solid state drives) that are connected on a network (e.g., a storage attached network (SAN)) and configured to redundantly store information in order to prevent data loss. The storage devices may store data persistently and thus the database may serve as persistent storage for database system 106. Further, as discussed, components of system 100 may utilize the available cloud resources of a cloud infrastructure and thus the data of the database may be stored using a storage service provided by a cloud provider (e.g., Amazon S3®). In various embodiments, database system 106 may include a multi-tenant database (as discussed in more detail with respect to FIG. 7) in which multiple tenants may each store a respective set of data in the database.

In various embodiments, database system 106 stores data across multiple nodes (discussed in more detail with respect to FIG. 5) and may be responsible for executing the incoming queries from users 102. During execution, database system 106 may register queries that are relevant to updates being made to its optimizer (or any other component within database system 106) using an internal process, such as a RegisterQuery( ) function, which is discussed in greater detail with respect to FIG. 3. In some embodiments, the optimizer identifies specific queries whose execution may be impacted by the updates and flags them for capture. After identification, database system 106 may capture query execution information when the specific queries are executed and share the information with client system 104, as illustrated by step 3. The captured information may include query text, input parameter values, configuration values, and/or other information (e.g., a statement ID, parameter types, an experiment ID and/or a tenant ID). As discussed above, query execution information may allow for the queries to be replayed later (e.g., by client system 104).

After client system 104 receives query execution information from database system 106, in various embodiments, it processes the captured information and initiates a replay process of the captured queries with updates to database system 106 enabled and disabled. The replay process by client system 104, in various embodiments, is divided into two stages or two replays, one with the database system updates disabled (step 4A) and another with the database system updates enabled (step 4B). In some embodiments, client system 104 issues a replay request to database system 106 with a configuration that disables the particular database system updates (e.g., updates/changes to the optimizer). As part of step 4A, client system 104 may record query execution statistics, serving as a baseline for comparison. As part of step 4B, client system 104 may replay the same queries but with the particular database system updates enabled and record the query execution statistics, for comparison with the baseline. In some embodiments, the query execution statistics from both stages (with changes enabled and disabled) may be collected and returned by database system 106 to client system 104 for further analysis and comparison (e.g., by comparator 110). It is noted that step 4B may be performed first instead of step 4A or they may be performed at least partially in parallel (e.g., on different database nodes of database system 106).

Comparator 110, in various embodiments, is software executable to compare, or otherwise assess, the performance of database system 106 with the updates enabled and the performance of database system 106 with the updates disabled. As an example, comparator 110 may determine if there are queries that executed successfully with the updates disabled but failed when the updates were enabled. As another example, comparator 110 may determine if the execution time of a query with the updates enabled exceeded the execution time of the query with the updates disabled (e.g., by a threshold amount of time, such as 10%). Based on the assessment by comparator 110, client system 104 can produce an output, represented as an analysis result in step 5. By way of example, this result may provide detailed insights (e.g., via a report) into the performance of database system 106 before and after the updates were enabled. In some instances, the analysis result may indicate the presence of performance regressions, functional errors, and other adverse effects, which may allow developers to make informed decisions on whether to deploy the updates such that they can affect users 102 in a live environment. This process may mitigate one or more risks of deploying untested updates and ensure that any changes made to database system 106 are vetted using real-world query scenarios before being introduced into a production system.

Figure 2:
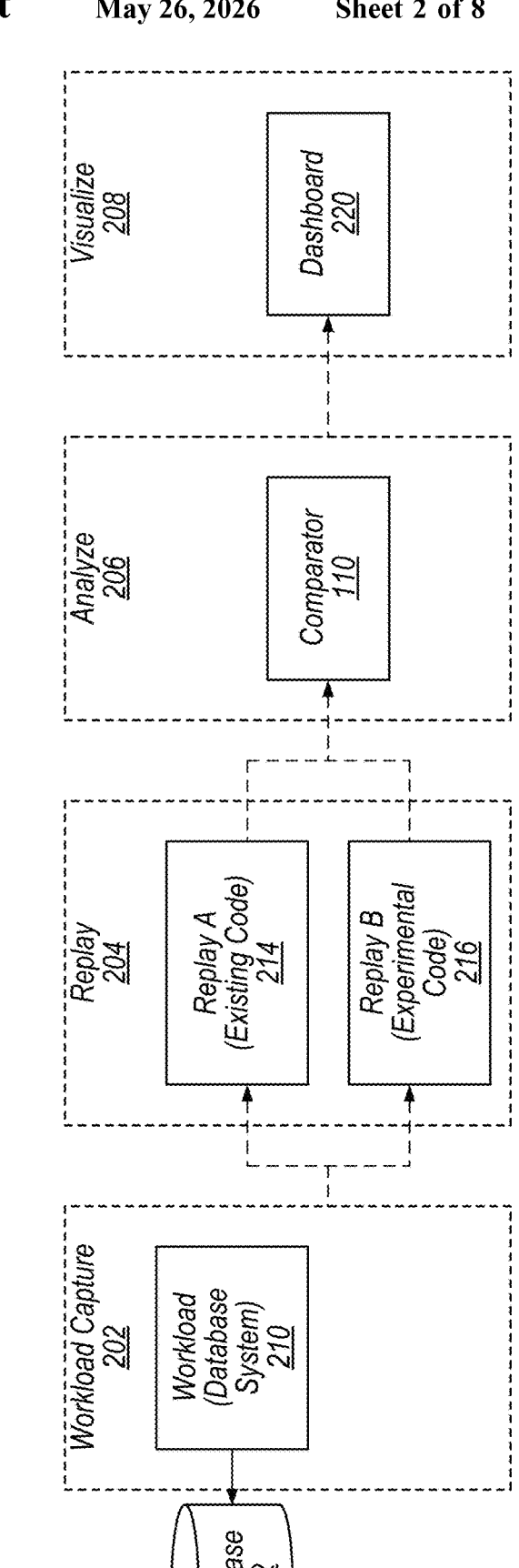
FIG. 2 is a block diagram illustrating one embodiment of an overview process for testing a database system with updates enabled and disabled.

Turning now to FIG. 2, a block diagram illustrating an overview process 200 for testing database system 106 with updates enabled and disabled is shown. In the illustrated embodiment, overview process 200 involves a database 212, a workload capture process 202, a replay process 204, an analyze process 206, and a visualization process 208. In various embodiments, processes 202, 204, 206, and 208 are performed by client system 104, although a portion of visualize process 208 may be performed externally (e.g., not by client system 104 or database system 106). In other embodiments, any of the processes illustrated in FIG. 2 may be performed by client system 104 or database system 106.

Database 212, in various embodiments, is a database that is used to store query execution information generated as a part of a workload 210 performed by database system 106. Workload 210 may involve user-submitted queries, and database 212 may correspond to a relational database (e.g., MySQL®, PostgreSQL®, or similar systems). In some embodiments, database 212 is further used to store data of users 102. Accordingly, the user-submitted queries that are performed as part of workload 210 may access, store, and/or update data of database 212. But in other embodiments, database 212 is a standalone database from the one used to store data of users 102—i.e., database 212 may store data for replaying queries but not data of users 102.

Workload capture process 202, in various embodiments, is a process in which queries are dynamically captured as they are executed by database system 106. As discussed in greater detail with respect to FIG. 3, during workload capture process 202, database system 106 may identify and capture particular queries issued by client system 104. Capturing these queries may include storing, in database 212, query execution information including, but not limited to, performance statistics, configurations, parameter values, and/or other metadata needed for replay. This query information may be used in subsequent processes (e.g., replay process 204) to replay and evaluate the impacts of updates to database system 106.

Replay process 204, in various embodiments, is process in which the captured queries are replayed by client system 104 using database system 106. Replay process 204 involves two replay steps: replay A (existing code) 214 and replay B (experimental code) 216. In various embodiments, replay A 214 corresponds to a replay in which the captured queries are executed under the existing (pre-update) configuration of database system 106, while replay B 216 corresponds to a replay in which the same queries are executed but with updates (e.g., updates to database system 106, such as optimizer changes) enabled. This process may enable client system 104 to evaluate how changes to database system 106 affect the performance of the queries. To perform the replays, client system 104 may access corresponding query execution information from database 212, issue the captured queries to database system 106 using the query execution information, and gather the performance metrics for the replays, which are analyzed for differences. Various aspects of replay process 204 are discussed in greater detail with respect to FIG. 4. Moreover, as discussed in greater detail with respect to FIG. 5, replay process 204 may performed on user data on a read-only clone of the main/primary database of database system 106.

Analyze process 206, in various embodiments, is process in which the performance metrics of the queries from replays A 214 and B 216 are compared using comparator 110. This analysis may identify whether the experimental code introduces performance regressions, improvements, and/or functional discrepancies when compared to the baseline performance that is exhibited by the existing code. In some embodiments, comparator 110 flags any queries that show significant deviations, such as longer execution times, memory consumption, or other inefficiencies or errors. For example, if a particular query took five milliseconds to execute during replay A 214 but took five hundred milliseconds to execute during replay B 214, then this may indicate that the associated update is causing a performance reduction. In various embodiments, comparator 110 generates a report that provides a comparison of the replay steps that allows for a developer or another user to determine whether the one or more updates being made are problematic.

Visualization process 208, in various embodiments, is a process in which the output from analyze process 206 is displayed on a dashboard 220. Dashboard 220 may be a user interface that is presented to a user 102 and may visually present (e.g., via the report from comparator 110) the flagged issues and highlight the performance differences between the existing and experimental code, allowing developers to make informed decisions about deploying or adjusting the changes before they are rolled out to a live environment.

Turning now to FIG. 3, a block diagram illustrating one embodiment of workload capture process 202 relating to capturing query execution information that involves an exchange between database system 106 and client system 104 is shown. As depicted in the illustrated embodiment, database system 106 comprises a query parser 302, a query optimizer 304, a query executor 306, a Bloom filter 312, and a shared memory queue or buffer 314. As further shown, workload capture process 202 involves a RegisterQuery( ) function 308 and a CaptureQuery( ) function 310. Also as shown, shared memory queue 314 is accessible to client system 104. The illustrated embodiment may be implemented differently than shown.

When a query is submitted by client system 104, it may first be parsed by query parser 302 of database system 106. Query parser 302, in various embodiments, parses a received query, which may include performing a syntax analysis of the clauses within the query and assembling a data structure (e.g., an expression tree) that can be processed by query optimizer 304. Query parser 302 may also separate any constraints from the query and attempt to flatten the query if it includes subqueries. This flattening may include merging a query and a subquery into a single query as well as merging together constraints if multiple constraints have been specified for the query and its subquery. Also, as part of the parsing, the query parser may perform one or more checks, such as a syntax check that checks whether the received query breaks a database rule, a semantic check that checks whether the objects specified in the query exist, etc. The assembled data structure is provided as an input into query optimizer 304.

Query optimizer 304, in various embodiments, generates an execution plan for the query, which may include evaluating various execution plans and selecting one to implement based on predefined rules, algorithms, and/or cost estimates (e.g., processing time, memory consumption, etc.). Query optimizer 304 may use any suitable algorithm to evaluate and select execution plans. In some embodiments, optimizer 304 may use a heuristic algorithm in which execution plans are assessed based on a set of rules provided to optimizer 304. In other embodiments, optimizer 304 uses a cost-based algorithm in which optimizer 304 performs a cost analysis that includes assigning scores to execution plans based on their estimated processor consumption, their estimated memory consumption, their estimated execution time, etc. These estimates may further be based on various metrics such as the number of distinct values in table columns, the selectivity of predicates (the fraction of rows the predicate would qualify), the cardinalities (e.g., row counts) of the tables being accessed. Based on the scores, query optimizer 304 may then select an execution plan that has the best score.

As part of this process, optimizer 304 may invoke RegisterQuery( ) function 308. Function 308, in various embodiments, is responsible for registering or otherwise indicating that a query is to be captured as the query may be deemed relevant to one or more updates being made to database system 106 (e.g., an update to optimizer 304). In particular, function 308 may be inserted into the code of query optimizer 304 (e.g., at a location that is deemed relevant to the specific updates). In various embodiments, logic is inserted into the code before function 308 to determine whether a query should be captured—that is, the logic may evaluate a received query to determine whether it is relevant to a specific update. By way of example, if the query meets certain criteria (e.g., touches areas of optimizer 304 undergoing changes), then RegisterQuery( ) function 308 may be triggered to register that query for future capture. The criteria assessed before invoking function 308 may be set by the developer associated with the update that is being made as the developer may be best positioned to understand which types of queries are likely to be relevant to the update. As such, function 308 may register queries that are deemed relevant, e.g., by the developer. In various embodiments, the code of query optimizer 304 include multiple instances of function 308, where each instance may be associated with a respective update being made and thus may register queries that are deemed relevant to that respective update. To register a query for capture, function 308 may include a configuration in the selected query plan, add an entry to a query capture table, or perform another operation to trigger query executor 306 to capture the query. An update identifier corresponding to an update and a query identifier corresponding to a query may be provided as input into function 308 so that the query can be correlated to the update.

Once an execution plan has been selected, query executor 306, in various embodiments, is operable to execute the selected plan. Accordingly, query executor 306 may perform the various actions listed in the plan, which may include accessing one or more data tables, indexes, and/or other database objects stored in a database of database system 106. Query executor 306 may then return any results to service the query. As part of executing a given query, query executor 306 may determine whether the query should be captured and, if so, invoke CaptureQuery( ) function 310. For example, query executor 306 may detect that a query has been registered using a query capture table and thus invoke CaptureQuery( ) function 310 for that query. CaptureQuery( ) function 310, in various embodiments, is invoked by query executor 306 to store query execution information (e.g., statement ID, statement text, parameter types, parameter values, experiment ID, organization ID, etc.) that may be used to replay a query. Query executor 306 may capture the query execution information instead of query optimizer 304. In various embodiments, updates may also be made to query executor 306. Accordingly, query executor 306 may also invoke RegisterQuery( ) function 308 for queries that are deemed relevant to updates being made to query executor 306. In various embodiments, calls to RegisterQuery( ) function 308 must occur before the call to CaptureQuery( ) function 310. Since query executor 306 may invoke RegisterQuery( ) function 308, query executor 306 is responsible for invoking CaptureQuery( ) function 310 instead of query optimizer 304, in various embodiments.

The query execution information is stored in shared memory queue 314. Shared memory queue 314, in various embodiments, is used to temporarily store the query execution information, making it accessible to client system 104. In some cases, a query may be registered by multiple different experiments for capture, where an experiment may correspond to the testing of one or more updates. In such cases, multiple rows may be inserted into shared memory queue 314 for that single query. That is, multiple updates may be made to query optimizer 304 (for example) and a single query may be deemed relevant for each of those updates. Accordingly, multiple instances of query execution information for that query may be stored in shared memory queue 314, although each instance may be different in that it identifies a different experiment. Client system 104 may pull or retrieve the stored query information from shared memory queue 314 (e.g., via an SQL function), which may allow the queries to be replayed for testing purposes.

In various embodiments, to avoid capturing the same query each time it is executed, Bloom filter 312 may be used to detect whether query execution information for the query is already stored in shared memory queue 314. In particular, query executor 306 (or another component of database system 106) may hash a portion (e.g., experiment ID and statement ID) or all of the captured query execution information for a query to derive a hash value and check if the bits corresponding to that hash value have already been set in Bloom filter 312. If the corresponding bits are set, then query executor 306 may recognize that the query execution information has likely already been captured and stored. If the bits are not set, then the relevant bits may be set in Bloom filter 312 and the query execution information may be stored in shared memory queue 314 (e.g., stored in the hash table based on the hash value), where it may be temporarily stored until client system 104 retrieves it for the replay process.

Figure 4:
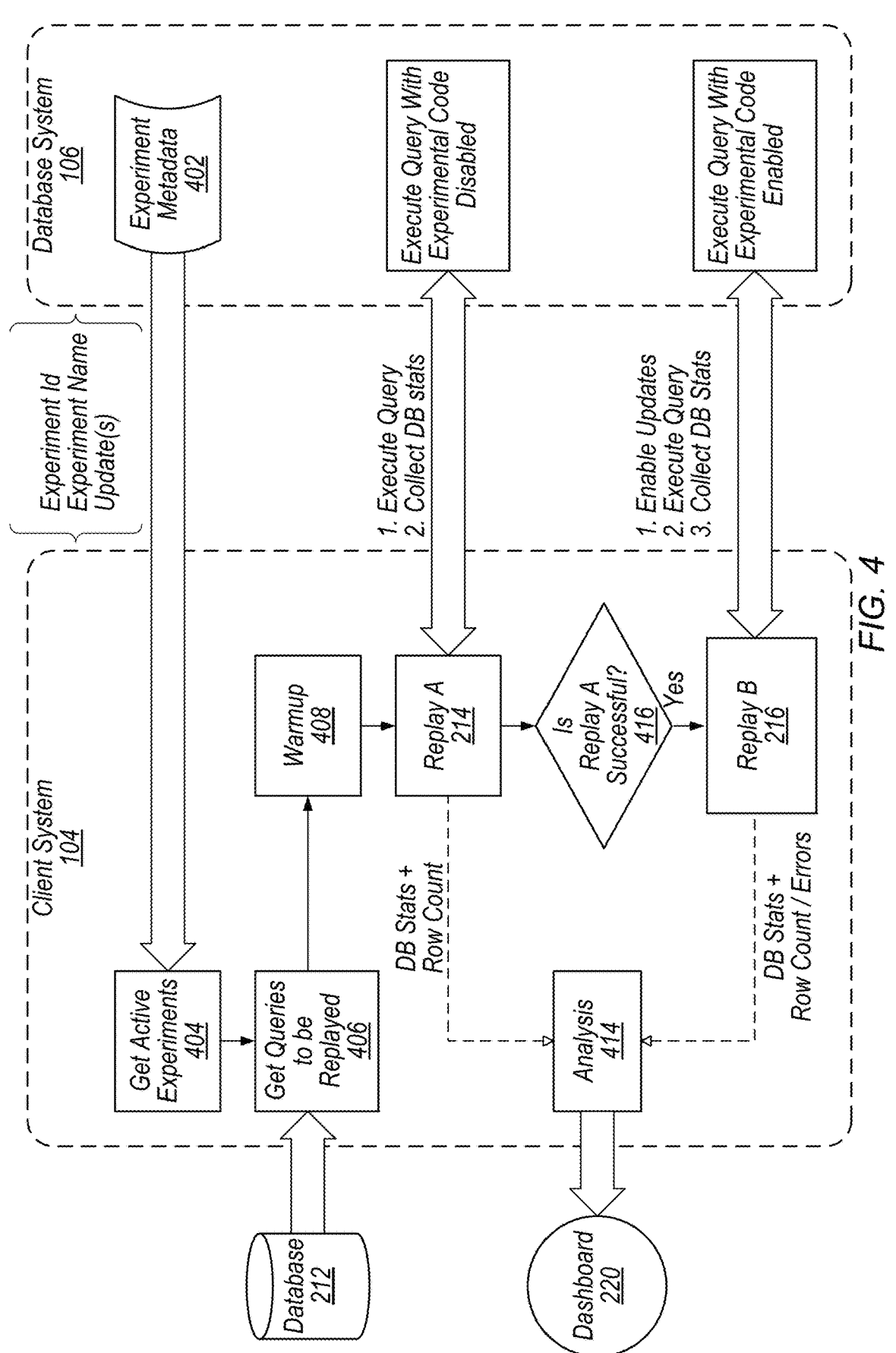
FIG. 4 is a block diagram illustrating one embodiment of a query replay process to replay captured queries to test and evaluate updates to a database system.

Turning now to FIG. 4, a block diagram illustrating one embodiment of processes 204, 206, and 204 in which queries are replayed and analyzed is shown. In the illustrated embodiment, an interaction between client system 104, database system 106, database 212, and dashboard 220 is shown. As discussed, client system 104 may replay queries to evaluate the impact of updates being made to database system 106, and the results of this replay may be presented via dashboard 220. Client system 104 may initially access experiment metadata 402 at a get active experiments step 404. Experiment metadata 402, in various embodiments, includes experiment information such as an experiment ID, an experiment name, and information identifying the update(s) corresponding to the experiment. Accordingly, based on experiment metadata 402, in various embodiments, client system 104 determines which experiments to perform, where a given experiment may involve the testing of an update being made to database system 106. A given experiment may be set up by the developer who is making the update to database system 106. In various cases, once the update has been thoroughly tested and implemented, the developer may disable that experiment such that the update is not further tested.

Once client system 104 retrieves experiment metadata 402, at a get queries to be replayed step 406, client system 104 accesses query execution information for the queries that are relevant to the particular experiment(s) being performed. As discussed, the query execution information for a query may store an experiment ID. Accordingly, client system 104 may use a given experiment ID to lookup the query execution information for all queries that map to that given experiment ID. Once client system 104 has acquired the query execution information for the queries that are being replayed, client system 104 warms up one or more caches at a warmup step 408. Warmup step 408 may help prevent an initial batch of queries from performing more poorly than they typically would if the one or more caches were not cold. That is, at warmup step 408, client system 104 may fill one or more caches so that the caches are not empty when the queries are processed. As a result, the initial batch of queries may not perform poorly due to cache misses. In various embodiments, warmup step 408 is performed by running a query once before replay A 214 and once before replay B 216. Warmup step 408 may be performed for each query that is being replayed-that is, warmup step 408 may be performed before every query is replayed and therefore may prevent a query from performing more poorly than it typically would.

After the warmup process is completed, the queries are first executed as part of replay A 214, where the queries are executed with a GUC (Grand Unified Configuration) set to disable any experimental features. In various embodiments, GUC refers to a configuration parameter that is used in database system 106 to control whether specific database features/updates are enabled or disabled during query execution. Accordingly, the captured queries are performed with the one or more updates disabled, and client system 104 collects database statistics for query executions. The database statistics that are collected by client system 104 may include any of a variety of statistics, such as the execution time of a query, a row count of the number of rows affected by a query, the amount of memory and CPU capacity used to process a query, whether an error when processing a query, remote procedure calls (RPCs) made when processing a query, the number of index scans, the number of I/O operations, the number of locks acquired, etc. The collected database statistics may provide a baseline performance measurement with the existing code.

Once replay A 214 is completed, client system 104 evaluates whether replay A 214 was successful at decision block 416. If replay A 214 was successful, then client system 104 proceeds to replay B 216, where the same queries are executed with the experimental code (the updates) enabled. Accordingly, the captured queries are performed with the one or more updates enabled, and client system 104 collects database statistics (e.g., row counts, CPU usage, execution time, etc.) for the executed queries. The database statistics may provide a performance measurement with the experimental code. Both replay phases, replay A 214 and replay B 216, collect database statistics, which are processed at an analysis step 414. At analysis step 414, comparator 110 may perform one or more comparisons of the database statistics between the baseline and experimental query execution. For example, comparator 110 may compare the execution time of a query with an update enabled versus the execution time with the update disabled, the memory usage with the updated enabled versus the memory usage with the update disabled, etc. Comparator 110 may send the results to dashboard 220, where developers may view the performance data (e.g., such as row counts, query execution times, errors, and/or other performance metrics). In various embodiments, comparator 110 dumps results into a log and dashboard 220 uses analytics to query lines of the log to display data.

In some examples, the process of replaying queries ensures that performance regressions, functional errors, and/or other issues that arise due to database system 106 changes are identified before these updates are deployed in a production environment. By utilizing the GUC to enable or disable experimental features/updates, the system may allow a controlled testing environment that compares the baseline execution to the experimental execution and provide insight into the impact of any updates made to database system 106.

Figure 5:
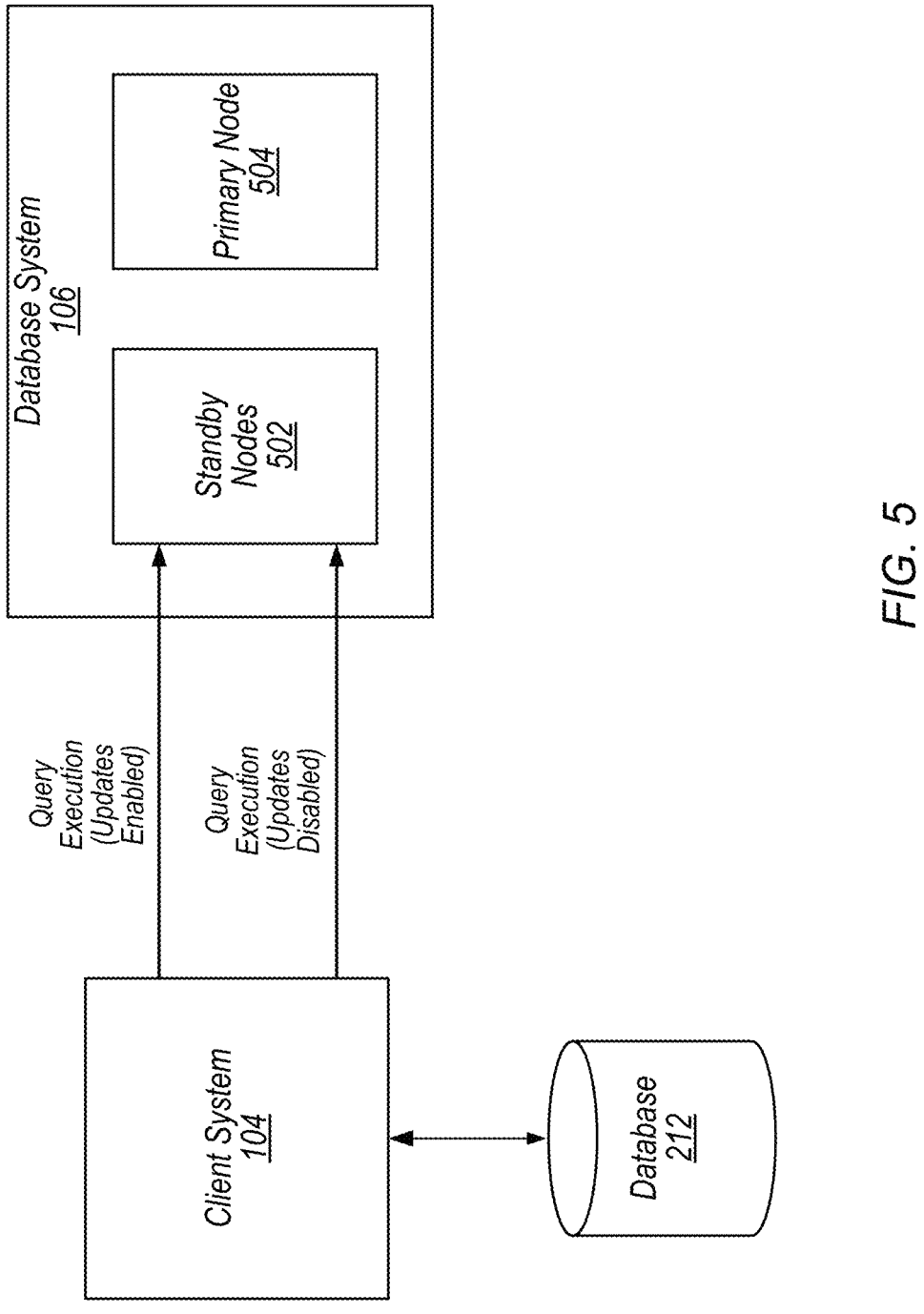
FIG. 5 is a block diagram illustrating one embodiment of a client system replaying queries on standby nodes of a database system.

Turning now to FIG. 5, a block diagram illustrating one embodiment of client system 104 replaying queries utilizing standby nodes 502 of database system 106 is shown. In the illustrated embodiment, there is client system 104, database system 106, and database 212. As further shown, database system 106 includes a primary node 504 and standby nodes 502.

Primary node 504, in various embodiments, implements a primary database server that is responsible for handling read and write database operations from clients (e.g., queries from client system 104). Primary node 504 may contain the most up-to-date version of the database of database system 106 and manage transaction processing and data consistency. In contrast, standby nodes 502, in various embodiments, implement standby database servers that are replicas of the primary database and are typically used for disaster recovery and high availability. Standby nodes 502 may maintain a synchronized or nearly synchronized copy of the primary database but are usually in a read-only mode. In the event of a failure or downtime on primary node 504, a standby node 502 can be promoted to take over operations, ensuring minimal service interruption.

In various embodiments, standby nodes 502 are used for replaying queries. Standby nodes 502 may be used because they may have sufficient available CPU capacity that can be used without causing noticeable interference with live customer traffic. Since standby nodes 502 may process only read queries, the queries that are captured for replay may be only read queries. Furthermore, the captured queries may be replayed against actual user data stored in the database of database system 106. Accordingly, it may be desirable to capture read queries and not write queries so that the user data is not changed. In some embodiments, read and write queries may be captured and/or primary node 504 may be used to replay captured queries. Furthermore, a copy of user data stored in the database may be made (e.g., a replica database may be spun up in a test environment), and the captured queries may be replayed against the copy of user data. As such, write queries may be replayed against the copy of user data without affecting the actual user data being accessed by live customer traffic.

As shown in FIG. 5, client system 104 communicates with standby nodes 502 for the two replays: one with updates enabled and one with updates disabled. As discussed, client system 104 may access query execution information for the queries that are relevant to the updates being made. During the replay process, client system 104 may first issue the identified queries to standby nodes 502 with updates to database system 106 (e.g., changes to optimizer 304) disabled. In this stage, the baseline performance of the queries may be measured. Next, the same queries may be replayed on standby nodes 502, but this time with database system 106 changes enabled. The comparison of query performance with and without database system 106 updates may allow for developers to assess the impact of the updates. While this disclosure discusses evaluating updates to the query optimizer (e.g., query optimizer 304) of a database system, the disclosed techniques can be used to evaluate updates to other components of the database system, such as a query parser (e.g., query parser 302), a query executor (e.g., query executor 306), etc.

Turning now to FIG. 6A, a flow diagram of a method 600 is shown. Method 600 is one embodiment of a method performed by a computer system (e.g., system 100) as a part of assessing the impacts of updates to a database system (e.g., database system 106). In various embodiments, method 600 is performed by executing program instructions stored on a non-transitory computer-readable storage medium. In some embodiments, method 600 includes more or fewer steps than shown. As an example, method 600 may include a step in which the computer system replays one or more queries to determine a second performance of the database system with the one or more updates disabled.

Method 600 begins in step 605 with the computer system receiving, from a set of users (e.g., a set of users 102), a plurality of queries to execute against a database (e.g., database 212) that stores data for the set of users. In step 610, the computer system identifies one or more queries of the plurality of queries that are deemed relevant to one or more updates being made to a database system of the computer system.

In step 615, the computer system executes the plurality of queries and captures query execution information corresponding to the one or more queries that enables the computer system to replay the identified one or more queries. For example, client system 104 may submit a query to database system 106 and, during execution, database system 106 may capture query execution information (e.g., performance metrics, configurations, and/or bind parameters) associated with the identified one or more queries. This query execution information may be temporarily stored in a memory buffer (e.g., shared memory queue 314) accessible to client system 104. The information stored in the buffer may enable the computer system to replay the queries at a later time, either with database updates enabled or disabled, allowing for performance comparisons and analysis of the database system's behavior under different conditions.

In step 620, the computer system replays the one or more queries against the database with the one or more updates enabled. For example, client system 104 may retrieve the previously captured query execution information from the memory buffer and issue the identified queries to database system 106 with the updates (e.g., changes to optimizer 304 or other database features) enabled. Database system 106 may execute the queries using the updated configuration, and client system 104 may collect performance data (e.g., such as execution times, memory usage, and error rates, etc.). In step 625, based on the replaying, the computer system provides an indication of a first performance of the database system with the one or more updates enabled.

In some embodiments, the plurality of queries include both read-only queries and queries that change the data stored in the database, while the identified one or more queries include only read-only queries. In various embodiments, the database system includes a set of primary nodes (e.g., primary nodes 504) and a set of standby nodes (e.g., standby nodes 502), and the replaying of the one or more queries against the database with the one or more updates enabled occurs using the set of standby nodes. But the plurality of queries may be executed using the set of primary nodes. For example, client system 104 may send the plurality of queries, which include both read-only and data-modifying queries, to a primary node 504 of database system 106 for execution in a live environment. During execution on that primary node 504, query execution information may be captured, such as for queries registered by RegisterQuery( ) function 308, and then client system 104 may replay the captured queries by sending them to a set of standby nodes 502 for execution.

In some embodiments, method 600 further includes the computer system replaying, based on the query execution information, the identified one or more queries against the database with the one or more updates disabled to derive a second performance of the database system. The computer system may then compare the first performance of the database system with the one or more updates enabled with the second performance of the database system with the one or more updates disabled. Based on the comparison, the computer system may generate a report indicating an effect/impact of the one or more updates on the database system. For example, client system 104 may replay the identified queries on standby nodes 502, first with the updates to database system 106 enabled and then again with the updates disabled. The results of both replay processes, including performance metrics such as execution time, memory usage, and/or error rates, may be collected and analyzed. The computer system may generate a comparative report that highlights differences between the performances. This comparative report may be visualized and presented to developers via dashboard 220, providing insights into whether the one or more updates introduce performance regressions, improvements, functional errors, etc.

In some embodiments, capturing query execution information includes storing the query execution information in a memory buffer accessible to the client system of the computer system. The client system may access the query execution information and issue, as a part of the replaying, the one or more queries against the database system with the one or more updates enabled. For example, once the query execution information is captured by CaptureQuery( ) function 310, it may be stored in shared memory queue 314. Client system 104 may then retrieve the query execution information, which may include query text, bind parameters, and configurations. After accessing this information, client system 104 may issue the one or more identified queries to database system 106 for replay, this time with the updates to the system enabled (e.g., optimizer changes or feature updates).

In some embodiments, method 600 further includes steps for determining, via a bloom filter, whether the query execution information is already stored in the memory buffer to prevent multiple instances of the query execution information from being stored in the memory buffer. For example, when query execution information is captured, CaptureQuery( ) function 310 may hash the query execution data and check it against Bloom filter 312. If Bloom filter 312 indicates that the query execution information has potentially already been stored, then the computer system may recognize the duplicate and prevent storing it again in shared memory queue 314.

In some embodiments, method 600 further includes steps for providing, via the computer system, an indication that one or more errors occurred when executing at least one of the one or more queries against the database with the one or more updates enabled. For example, during the replay process, client system 104 may monitor the execution of the identified queries on database system 106. If any errors occur (e.g., such as query failures or unexpected results due to the updates enabled in the system), these errors may be captured and/or flagged by the computer system. The client system 104 may generate an error report, which can be displayed on dashboard 220, to provide developers with details about the specific query and the error that occurred and allow them to review and address the issue before the updates are deployed in a live environment.

Turning now to FIG. 6B, a flow diagram of a method 630 is shown. Method 630 is one embodiment of a method performed by a computer system (e.g., system 100) as a part of assessing the impacts of updates to a database system (e.g., database system 106). In various embodiments, method 600 is performed by executing program instructions stored on a non-transitory computer-readable storage medium. In some embodiments, method 630 includes more or fewer steps than shown. As an example, method 630 may include a step in which the computer system replays one or more queries to determine a second performance of the database system with the one or more updates disabled.

Method 630 begins in step 635 with the computer system receiving, from a set of users (e.g., a set of users 102), a plurality of queries to execute against a database (e.g., database 212) that stores data for the set of users. In various embodiments, the set of users send database requests to a client system (e.g., client system 104) that issues corresponding queries to the database system of the computer system. In step 640, the computer system identifies one or more queries of the plurality of queries that are deemed relevant to one or more updates being made to the database system of the computer system. In step 645, the computer system executes the plurality of queries and, in step 650, captures query execution information corresponding to the identified one or more queries that enables the computer system to replay the identified one or more queries.

In step 655, the computer system replays the one or more queries with the one or more updates enabled to determine a first performance of the database system. For example, client system 104 may replay the identified queries on standby nodes 502, as illustrated in FIG. 5, with the changes or updates enabled in database system 106. During this process, the computer system may capture performance metrics, such as query execution time, CPU usage, and memory usage, to generate a first performance profile of database system 106 under the updated configuration.

In step 660, the computer system determines whether the first performance represents a reduction in performance relative to a second performance of the database system with the one or more updates disabled. For example, the computer system may compare the performance metrics captured during the replay of queries with updates enabled against those from a previous replay where the updates were disabled. If a reduction in performance is identified, the computer system may flag the relevant updates as potentially problematic and allow developers to make informed decisions on whether to proceed with the updates.

In some embodiments, method 630 further includes steps for, after executing the plurality of queries, replaying the one or more queries against the database with the one or more updates disabled to determine the second performance of the database system. For example, client system 104 may replay the identified queries on standby nodes 502 or primary nodes 504 with the updates disabled. This second replay may provide a baseline performance of the database system without the applied updates. The computer system may collect performance data such as query execution time, CPU and memory usage, and other relevant statistics, which may then be used to create a second performance profile. By comparing the first and second performances, the computer system may assess the effect/impact of the database updates more accurately. The second performance of the database system may be determined as a part of the execution of the plurality of queries in step 645. For example, as queries are being executed by database system 106, client system 104 may capture performance metrics with the updates disabled in real-time.

Exemplary Multi-Tenant System

Figure 7:
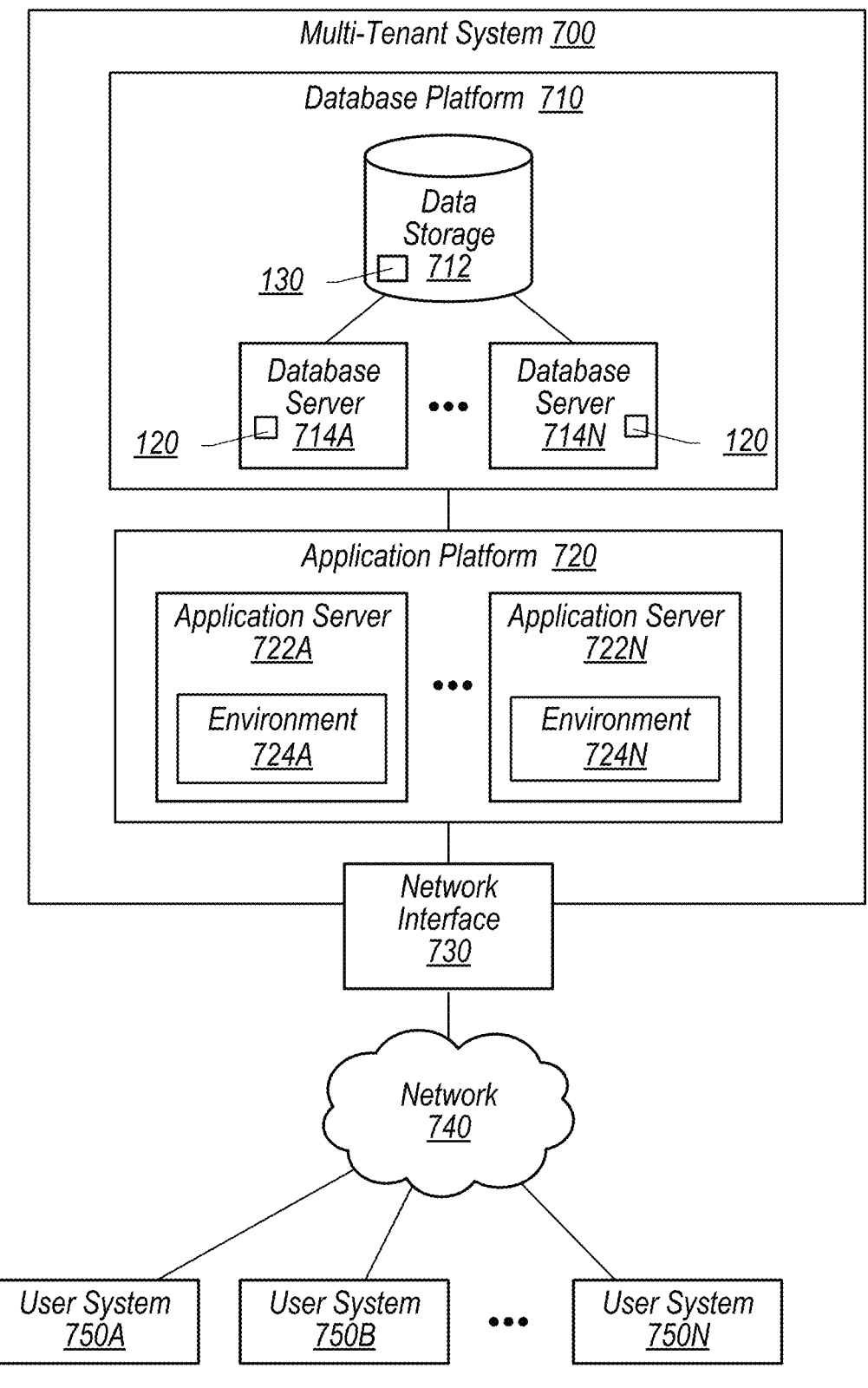
FIG. 7 is a block diagram illustrating one embodiment of an exemplary multi-tenant system for implementing various systems described herein.

Turning now to FIG. 7, an example multi-tenant system (MTS) 700, which may implement functionality of system 100, is shown. In the illustrated embodiment, MTS 700 includes a database platform 710, an application platform 720, and a network interface 730 connected to a network 740. Database platform 710 includes a data storage 712 and a set of database servers 714A-N that interact with data storage 712, and application platform 720 includes a set of application servers 722A-N having respective environments 724. As shown in the illustrated embodiment, MTS 700 is connected to various user systems 750A-N via network 740. In other embodiments, techniques disclosed herein are implemented in other environments such as client/server environments, cloud computing environments, clustered computers, etc.

MTS 700, in various embodiments, is a set of computer systems that together provide various services to users (or sets of users alternatively referred to as "tenants") that interact with MTS 700. In some embodiments, MTS 700 implements a customer relationship management (CRM) system that provides mechanism for tenants (e.g., companies, government bodies, etc.) to manage their relationships and interactions with customers and potential customers. For example, MTS 700 might enable tenants to store customer contact information (e.g., a customer's website, email address, telephone number, and social media data), identify sales opportunities, record service issues, and manage marketing campaigns. Furthermore, MTS 700 may enable those tenants to identify how customers have been communicated with, what the customers have bought, when the customers last purchased items, and what the customers paid. To provide the services of a CRM system and/or other services, as shown, MTS 700 includes a database platform 710 and an application platform 720.

Database platform 710, in various embodiments, is a combination of hardware elements and software routines that implement database services for storing and managing data of MTS 700, including tenant data. Database platform 710 may implement database system 106. As shown, database platform 710 includes data storage 712. Data storage 712, in various embodiments, includes a set of storage devices (e.g., solid state drives, hard disk drives, etc.) that are connected together on a network (e.g., a storage attached network (SAN)) and configured to redundantly store data to prevent data loss. Data storage 712 may implement a single database, a distributed database, a collection of distributed databases, a database with redundant online or offline backups or other redundancies, etc.

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 700 may store, in the same table, database records for one or more tenants-that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, data storage 712 is organized as part of a log-structured merge-tree (LSM tree). A database server 714 may initially write database records into a local in-memory buffer data structure before later flushing those records to the persistent storage (e.g., in data storage 712). As part of flushing database records, the database server 714 may write the database records into new files/extents that are included in a "top" level of the LSM tree. Over time, the database records may be rewritten by database servers 714 into new files included in lower levels as the database records are moved down the levels of the LSM tree. In various implementations, as database records age and are moved down the LSM tree, they are moved to slower and slower storage devices (e.g., from a solid-state drive to a hard disk drive) of data storage 712.

When a database server 714 wishes to access a database record for a particular key, the database server 714 may traverse the different levels of the LSM tree for files that potentially include a database record for that particular key. If the database server 714 determines that a file may include a relevant database record, the database server 714 may fetch the file from data storage 712 into a memory of the database server 714. The database server 714 may then check the fetched file for a database record having the particular key. In various embodiments, database records are immutable once written to data storage 712. Accordingly, if the database server 714 wishes to modify the value of a row of a table (which may be identified from the accessed database record), the database server 714 writes out a new database record into the buffer data structure, which is purged to the top level of the LSM tree. Over time, that database record is merged down the levels of the LSM tree. Accordingly, the LSM tree may store various database records for a database key such that the older database records for that key are located in lower levels of the LSM tree then newer database records.

Database servers 714, in various embodiments, are hardware elements, software routines, or a combination thereof capable of providing database services, such as data storage, data retrieval, and/or data manipulation Database servers 714 may implement standby nodes 502 and/or primary nodes 504. The database services may be provided by database servers 714 to components (e.g., application servers 722) within MTS 700 and to components external to MTS 700. As an example, a database server 714 may receive a database transaction request from an application server 722 that is requesting data to be written to or read from data storage 712. The database transaction request may specify an SQL SELECT command to select one or more rows from one or more database tables. The contents of a row may be defined in a database record and thus database server 714 may locate and return one or more database records that correspond to the selected one or more table rows. In various cases, the database transaction request may instruct database server 714 to write one or more database records for the LSM tree-database servers 714 maintain the LSM tree implemented on database platform 710. In some embodiments, database servers 714 implement a relational database management system (RDMS) or object-oriented database management system (OODBMS) that facilitates storage and retrieval of information against data storage 712. In various cases, database servers 714 may communicate with each other to facilitate the processing of transactions. For example, database server 714A may communicate with database server 714N to determine if database server 714N has written a database record into its in-memory buffer for a particular key.

Application platform 720, in various embodiments, is a combination of hardware elements and software routines that implement and execute CRM software applications as well as provide related data, code, forms, web pages and other information to and from user systems 750 and store related data, objects, web page content, and other tenant information via database platform 710. In order to facilitate these services, in various embodiments, application platform 720 communicates with database platform 710 to store, access, and manipulate data. In some instances, application platform 720 may communicate with database platform 710 via different network connections. For example, one application server 722 may be coupled via a local area network and another application server 722 may be coupled via a direct network link. Transfer Control Protocol and Internet Protocol (TCP/IP) are exemplary protocols for communicating between application platform 720 and database platform 710, however, it will be apparent to those skilled in the art that other transport protocols may be used depending on the network interconnect used. Application platform 720 may implement client system 104.

Application servers 722, in various embodiments, are hardware elements, software routines, or a combination thereof capable of providing services of application platform 720, including processing requests received from tenants of MTS 700. Application servers 722, in various embodiments, can spawn environments 724 that are usable for various purposes, such as providing functionality for developers to develop, execute, and manage applications. Data may be transferred into an environment 724 from another environment 724 and/or from database platform 710. In some cases, environments 724 cannot access data from other environments 724 unless such data is expressly shared. In some embodiments, multiple environments 724 can be associated with a single tenant.

Application platform 720 may provide user systems 750 access to multiple, different hosted (standard and/or custom) applications, including a CRM application and/or applications developed by tenants. In various embodiments, application platform 720 may manage creation of the applications, testing of the applications, storage of the applications into database objects at data storage 712, execution of the applications in an environment 724 (e.g., a virtual machine of a process space), or any combination thereof. In some embodiments, application platform 720 may add and remove application servers 722 from a server pool at any time for any reason, there may be no server affinity for a user and/or organization to a specific application server 722. In some embodiments, an interface system (not shown) implementing a load balancing function (e.g., an F6 Big-IP load balancer) is located between the application servers 722 and the user systems 750 and is configured to distribute requests to the application servers 722. In some embodiments, the load balancer uses a least connections algorithm to route user requests to the application servers 722. Other examples of load balancing algorithms, such as are round robin and observed response time, also can be used. For example, in certain embodiments, three consecutive requests from the same user could hit three different servers 722, and three requests from different users could hit the same server 722.

In some embodiments, MTS 700 provides security mechanisms, such as encryption, to keep each tenant's data separate unless the data is shared. If more than one server 714 or 722 is used, they may be located in close proximity to one another (e.g., in a server farm located in a single building or campus), or they may be distributed at locations remote from one another (e.g., one or more servers 714 located in city A and one or more servers 722 located in city B). Accordingly, MTS 700 may include one or more logically and/or physically connected servers distributed locally or across one or more geographic locations.

One or more users (e.g., via user systems 750) may interact with MTS 700 via network 740. User system 750 may correspond to, for example, a tenant of MTS 700, a provider (e.g., an administrator) of MTS 700, or a third party. Each user system 750 may be a desktop personal computer, workstation, laptop, PDA, cell phone, or any Wireless Access Protocol (WAP) enabled device or any other computing device capable of interfacing directly or indirectly to the Internet or other network connection. User system 750 may include dedicated hardware configured to interface with MTS 700 over network 740. User system 750 may execute a graphical user interface (GUI) corresponding to MTS 700, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 750 to access, process, and view information and pages available to it from MTS 700 over network 740. Each user system 750 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 700 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 750 may be users in differing capacities, the capacity of a particular user system 750 might be determined one or more permission levels associated with the current user. For example, when a salesperson is using a particular user system 750 to interact with MTS 700, that user system 750 may have capacities (e.g., user privileges) allotted to that salesperson. But when an administrator is using the same user system 750 to interact with MTS 700, the user system 750 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 700 that are allocated at the tenant level while other data structures are managed at the user level.

In some embodiments, a user system 750 and its components are configurable using applications, such as a browser, that include computer code executable on one or more processing elements. Similarly, in some embodiments, MTS 700 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 740 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 750 may communicate with MTS 700 using TCP/IP and, at a higher network level, use other common Internet protocols to communicate, such as HTTP, FTP, AFS, WAP, etc. For example, where HTTP is used, user system 750 might include an HTTP client commonly referred to as a "browser" for sending and receiving HTTP messages from an HTTP server at MTS 700. Such a server might be implemented as the sole network interface between MTS 700 and network 740, but other techniques might be used as well or instead. In some implementations, the interface between MTS 700 and network 740 includes load sharing functionality, such as round-robin HTTP request distributors to balance loads and distribute incoming HTTP requests evenly over a plurality of servers.

In various embodiments, user systems 750 communicate with application servers 722 to request and update system-level and tenant-level data from MTS 700 that may require one or more queries to data storage 712. In some embodiments, MTS 700 automatically generates one or more SQL statements (the SQL query) designed to access the desired information. In some cases, user systems 750 may generate requests having a specific format corresponding to at least a portion of MTS 700. As an example, user systems 750 may request to move data objects into a particular environment 724 using an object notation that describes an object relationship mapping (e.g., a JavaScript object notation mapping) of the specified plurality of objects.

The various techniques described herein and all disclosed or suggested variations, may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, systems that implement the methods described with respect to any of the disclosed techniques are also contemplated. One such environment in which the disclosed techniques may operate is a cloud computer system. A cloud computer system (or cloud computing system) refers to a computer system that provides on-demand availability of computer system resources without direct management by a user. These resources can include servers, storage, databases, networking, software, analytics, etc. Users typically pay only for those cloud services that are being used, which can, in many instances, lead to reduced operating costs. Various types of cloud service models are possible. The Software as a Service (SaaS) model provides users with a complete product that is run and managed by a cloud provider. The Platform as a Service (PaaS) model allows for deployment and management of applications, without users having to manage the underlying infrastructure. The Infrastructure as a Service (IaaS) model allows more flexibility by permitting users to control access to networking features, computers (virtual or dedicated hardware), and data storage space. Cloud computer systems can run applications in various computing zones that are isolated from one another. These zones can be within a single or multiple geographic regions.

A cloud computer system includes various hardware components along with software to manage those components and provide an interface to users. These hardware components include a processor subsystem, which can include multiple processor circuits, storage, and I/O circuitry, all connected via interconnect circuitry. Cloud computer systems thus can be thought of as server computer systems with associated storage that can perform various types of applications for users as well as provide supporting services (security, load balancing, user interface, etc.).

One common component of a cloud computing system is a data center. As is understood in the art, a data center is a physical computer facility that organizations use to house their critical applications and data. A data center's design is based on a network of computing and storage resources that enable the delivery of shared applications and data.

The term "data center" is intended to cover a wide range of implementations, including traditional on-premises physical servers to virtual networks that support applications and workloads across pools of physical infrastructure and into a multi-cloud environment. In current environments, data exists and is connected across multiple data centers, the edge, and public and private clouds. A data center can frequently communicate across these multiple sites, both on-premises and in the cloud. Even the public cloud is a collection of data centers. When applications are hosted in the cloud, they are using data center resources from the cloud provider. Data centers are commonly used to support a variety of enterprise applications and activities, including, email and file sharing, productivity applications, customer relationship management (CRM), enterprise resource planning (ERP) and databases, big data, artificial intelligence, machine learning, virtual desktops, communications and collaboration services.

Data centers commonly include routers, switches, firewalls, storage systems, servers, and application delivery controllers. Because these components frequently store and manage business-critical data and applications, data center security is critical in data center design. These components operate together to provide the core infrastructure for a data center: network infrastructure, storage infrastructure and computing resources. The network infrastructure connects servers (physical and virtualized), data center services, storage, and external connectivity to end-user locations. Storage systems are used to store the data that is the fuel of the data center. In contrast, applications can be considered to be the engines of a data center. Computing resources include servers that provide the processing, memory, local storage, and network connectivity that drive applications. Data centers commonly utilize additional infrastructure to support the center's hardware and software. These include power subsystems, uninterruptible power supplies (UPS), ventilation, cooling systems, fire suppression, backup generators, and connections to external networks.

Data center services are typically deployed to protect the performance and integrity of the core data center components. Data center therefore commonly use network security appliances that provide firewall and intrusion protection capabilities to safeguard the data center. Data centers also maintain application performance by providing application resiliency and availability via automatic failover and load balancing.

One standard for data center design and data center infrastructure is ANSI/TIA-942. It includes standards for ANSI/TIA-942-ready certification, which ensures compliance with one of four categories of data center tiers rated for levels of redundancy and fault tolerance. A Tier 1 (basic) data center offers limited protection against physical events. It has single-capacity components and a single, nonredundant distribution path. A Tier 2 data center offers improved protection against physical events. It has redundant-capacity components and a single, nonredundant distribution path. A Tier 3 data center protects against virtually all physical events, providing redundant-capacity components and multiple independent distribution paths. Each component can be removed or replaced without disrupting services to end users. A Tier 4 data center provides the highest levels of fault tolerance and redundancy. Redundant-capacity components and multiple independent distribution paths enable concurrent maintainability and one fault anywhere in the installation without causing downtime.

Many types of data centers and service models are available. A data center classification depends on whether it is owned by one or many organizations, how it fits (if at all) into the topology of other data centers, the technologies used for computing and storage, and its energy efficiency. There are four main types of data centers. Enterprise data centers are built, owned, and operated by companies and are optimized for their end users. In many cases, they are housed on a corporate campus. Managed services data centers are managed by a third party (or a managed services provider) on behalf of a company. The company leases the equipment and infrastructure instead of buying it. In colocation ("colo") data centers, a company rents space within a data center owned by others and located off company premises. The colocation data center hosts the infrastructure: building, cooling, bandwidth, security, etc., while the company provides and manages the components, including servers, storage, and firewalls. Cloud data centers are an off-premises form of data center in which data and applications are hosted by a cloud services provider such as AMAZON WEB SERVICES (AWS), MICROSOFT (AZURE), or IBM Cloud.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of. . . . W, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   receiving, by a computer system from a set of users, a plurality of queries to execute against a database that stores data for the set of users;
   identifying, by the computer system, a subset of the plurality of queries that is deemed relevant to one or more updates being made to a database system of the computer system, wherein the identifying includes detecting that a given query of the subset of queries triggered a capture function inserted into code of the database system at a location associated with the one or more updates;
   executing, by the computer system, the plurality of queries, wherein the executing includes capturing query execution information corresponding to the subset of queries that enables the computer system to replay the subset of queries;
   replaying, by the computer system based on the query execution information, the subset of queries against the database with the one or more updates enabled; and
   based on the replaying, the computer system providing an indication of a first performance of the database system with the one or more updates enabled.

2. The method of claim 1, further comprising:
   replaying, by the computer system based on the query execution information, the subset of queries against the database with the one or more updates disabled to derive a second performance of the database system;
   comparing, by the computer system, the first performance of the database system with the one or more updates enabled with the second performance of the database system with the one or more updates disabled; and
   generating, by the computer system, a report indicating an effect of the one or more updates on the database system based on the comparison between the first and second performances.

3. The method of claim 1, wherein the capturing query execution information includes:
   storing, by the database system of the computer system, the query execution information in a memory buffer accessible to a client system of the computer system, wherein the client system is operable to access the query execution information and issue, as a part of the replaying, the subset of against the database system with the one or more updates enabled.

4. The method of claim 3, wherein the storing the query execution information includes:
   determining, via a bloom filter, whether the query execution information is already stored in the memory buffer to prevent multiple instances of the query execution information from being stored in the memory buffer.

5. The method of claim 1, wherein the plurality of queries include both read-only queries and queries that change the data stored in the database, and wherein the subset of queries includes only read-only queries.

6. The method of claim 1, further comprising:
providing, by the computer system, an indication that one or more errors occurred when executing at least one of the subset of queries against the database with the one or more updates enabled.

7. The method of claim 1, wherein the database system includes a set of primary nodes and a set of standby nodes, and wherein the replaying the subset of queries against the database with the one or more updates enabled occurs using the set of standby nodes.

8. The method of claim 7, wherein the executing the plurality of queries occurs using the set of primary nodes.

9. The method of claim 1, wherein the query execution information specifies, for a particular one of the subset of queries, query text, parameter values, and a set of configuration values.

10. A non-transitory computer-readable medium having program instructions stored thereon that are capable of causing a computer system to perform operations comprising:
receiving a plurality of queries from a set of users to execute against a database that stores data for the set of users;
identifying a subset of the plurality of queries that is deemed relevant to one or more updates being made to a database system of the computer system, wherein the identifying includes detecting that a given query of the subset of queries triggered a capture function inserted into code of the database system at a location associated with the one or more updates;
executing the plurality of queries;
capturing query execution information corresponding to the subset of queries that enables the computer system to replay the subset of queries;
replaying the subset of queries with the one or more updates enabled to derive a first performance of the database system; and
determining whether the first performance represents a reduction in performance relative to a second performance of the database system with the one or more updates disabled.

11. The non-transitory computer-readable medium of claim 10, wherein the operations further comprise, after the executing, replaying the subset of queries against the database with the one or more updates disabled to determine the second performance of the database system.

12. The non-transitory computer-readable medium of claim 10, wherein the operations further comprise determining the second performance of the database system as part of the executing the plurality of queries.

13. The non-transitory computer-readable medium of claim 10, wherein the subset of queries includes read-only queries and exclude any queries that change the data stored in the database.

14. The non-transitory computer-readable medium of claim 10, wherein the database system includes a set of primary nodes and a set of standby nodes, and wherein the replaying the subset of queries includes issuing the subset of queries to the set of standby nodes.

15. The non-transitory computer-readable medium of claim 10, wherein the operations further comprise storing the query execution information in a memory buffer accessible to a client system operable to access the query execution information and issue the subset of against the database system with the one or more updates enabled.

16. A system, comprising:
one or more processors;
memory having program instructions stored therein that are executable by the one or more processors to cause the system to perform operations comprising:
receiving a plurality of queries from a set of users to execute against a database that stores data for the set of users;
identifying a subset queries of the plurality of queries that is deemed relevant to one or more updates being made to a database system of the system, wherein the identifying includes detecting that a given query of the subset of queries triggered a capture function inserted into code of the database system at a location associated with the one or more updates;
executing the plurality of queries, wherein the executing includes capturing query execution information corresponding to the subset of queries;
replaying, based on the query execution information, the subset of using the database system with the one or more updates enabled; and
based on the replaying, determining a first performance of the database system with the one or more updates enabled; and
generating a report indicating whether the first performance represents a reduction in performance relative to a second performance of the database system with the one or more updates disabled.

17. The system of claim 16, wherein the database system includes a set of primary nodes and a set of standby nodes, and wherein the replaying the subset of queries occurs on the set of standby nodes.

18. The system of claim 16, wherein the operations further comprise replaying the subset of queries using the database system with the one or more updates disabled to determine the second performance of the database system.

19. The system of claim 16, wherein only queries of the plurality of queries that do not change the data stored in the database are captured in the query execution information.

20. The system of claim 16, wherein operations further comprise:
determining, via a bloom filter, whether the query execution information is already stored in a memory buffer that is accessible to a client system to prevent multiple instances of the query execution information from being stored in the memory buffer; and
storing the query execution information in the memory buffer in response to determining that an instance of the query execution information is not already stored in the memory buffer.

* * * * *